Patented Jan. 12, 1943

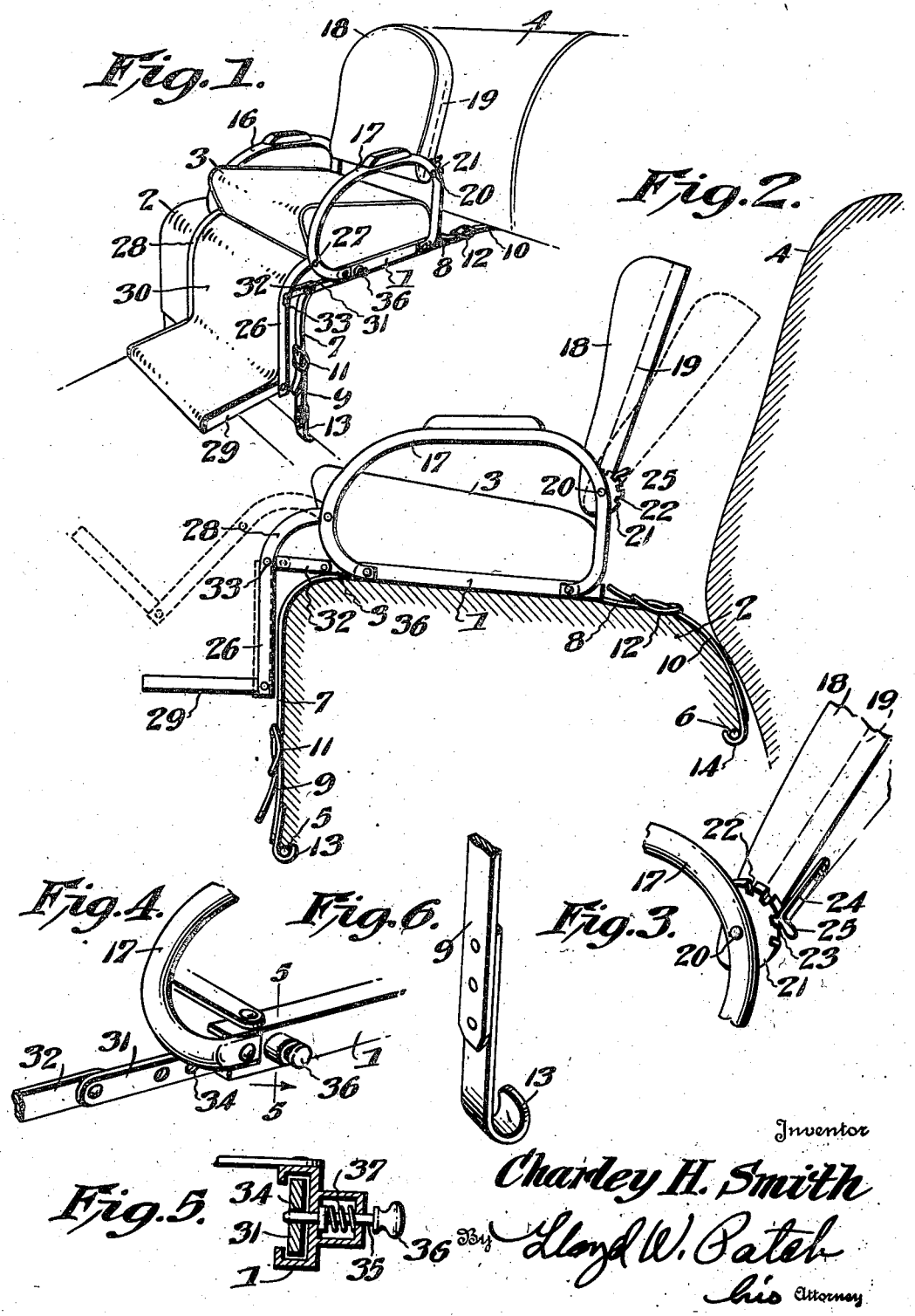

2,308,315

UNITED STATES PATENT OFFICE 2,308,315

AUTOMOBILE ACCESSORY SEAT

Charley Henry Smith, Pueblo, Colo.

Application January 31, 1941, Serial No. 376,899

3 Claims. (Cl. 155—10)

My invention relates to automobile accessory seats, and particularly to a collapsible and foldable and adjustable seat structure intended and adapted for use in an automobile, bus, train, aeroplane, or other vehicle or carrier designed to seat passengers while in transport, and so constructed that it can be fitted to and used upon an ordinary seat to provide an accessory seat for a child.

The primary object of this invention is to provide a seat of this character that is adjustable and collapsible and foldable, and which includes means for securely holding and mounting the accessory seat in position upon an ordinary seat, thereby providing a convenient and comfortable seat for a child disposed and held in such position that the child is seated and is positioned at an elevation where he may look through and see out of a window as usually provided adjacent to most passenger seats.

Another object is to so construct and associate the parts that back rest and foot rest portions provided as a part of the accessory seat can be adjusted to various desired positions and will be held in such adjustments.

Still another purpose is to so construct the foot rest portion, and in fact all parts of the accessory seat, that it need not materially interfere with ingress into or exit from or access to other seat portions.

A still further object is to provide means that will securely and rigidly hold the accessory seat in position upon the ordinary passenger seat and which can be quickly and conveniently connected and disconnected, as may be desired.

With the above and other objects in view, some of which will be apparent to those skilled in the art and others of which are inherent in or result from the construction and association of the parts and the use of the device, my invention includes certain novel features of construction and combinations of parts which will be hereinafter set forth in connection with the drawing and then pointed out in the claims.

In the drawing:

Figure 1 is a view in perspective showing an accessory seat constructed in accordance with my invention and fragmentarily illustrating a usual seat structure to disclose the manner of mounting and use.

Fig. 2 is an enlarged view of the accessory seat in side elevation, with portions of the usual passenger seat disclosed in fragmentary vertical section.

Fig. 3 is an enlarged fragmentary perspective view to better show the accessory seat back adjusting and supporting means.

Fig. 4 is an enlarged fragmentary perspective view showing a part of the foot rest supporting means.

Fig. 5 is an enlarged fragmentary sectional view substantially on line 5—5 of Fig. 4.

Fig. 6 is an enlarged fragmentary perspective view showing one of the supporting and mounting hooks.

The base or supporting frame 1 is preferably made up to be substantially rectangular when viewed in plan, and this base frame can be constructed in any desired manner and of any suitable materials. The base or supporting frame is adapted to fit and rest substantially flatwise, at its lower side, against and upon the upper surface of a seat cushion 2, such as an automobile cushion or the like, and a cushion 3 is mounted on and is carried by this base or supporting frame 1.

The cushion 2 is here indicated as the seat cushion of an automobile having a back cushion 4, and with ordinary seat cushions the spring and upholstery and fabric portions are built upon or associated with a frame structure including the front and back bars, as shown at 5 and 6 in Fig. 2; and, my invention contemplates anchoring or securing the accessory seat structure to or upon these bars or rods 5 and 6. With this in mind, I provide strap ends 7 and 8 extending forwardly and rearwardly from the supporting base 1, and adapted to lie upon and conform to the upper surface of the seat 2. Adjustable strap ends 9 and 10 are adjustably connected with the strap ends 7 and 8 through the medium of buckles 11 and 12, or other suitable adjustable fastenings, and these strap ends 9 and 10 have at their free ends the connecting or anchoring hooks 13 and 14, one of which is perhaps better illustrated in Fig. 6, so connected and disposed that the bill portions 15 of the hooks are presented in position and disposition to be caught or hooked under and to hold around the rods 5 and 6, or other edge frame portions of the seat cushion 2. In automobile, and in other usual passenger seat construction, a space is ordinarily provided between the seat cushion 2 and the back cushion 4 sufficient to permit insertion and engagement of the hooks 14, and the forward hooks 13 can of course be readily adjusted into holding position. Through the buckles 11 and 12 the associated straps can be drawn sufficiently tight or taut to hold the supporting frame or base 1 in the desired position and against displacement or movement, and it is also possible to adjust the relative disposition of the supporting base or frame 1 as this may be placed between the front and the back limits of the seat cushion 2.

The supporting base 1 has side arm portions 16 and 17 carried in upstanding relation on opposite sides of the accessory seat cushion 3, and an accessory seat back 18, built upon or including any suitable supporting frame 19 is adjustably and foldably swingably mounted at 20 at the rear extremity of the accessory seat cushion 3 and between the arm portions 16 and 17. As is indicated by the dotted lines in Fig. 2, this accessory seat back portion 18 can be adjusted to various inclined positions for use; and, the back portion 18 can also be swung forwardly to a folded or collapsed position where it will lie adjacent to the accessory cushion 3. In Fig. 3 I have shown one means of holding this back portion 18 in adjusted positions, and here the segmental member 21 carried by the arm member, at one or both sides, around the swinging mounting at 20, has a plurality of spaced notches 22 therein adapted to be engaged by a detent tooth 23 on a spring member 24 carried by the back portion 18, a knob 25, or other suitable portion, being preferably provided on this spring to permit manual flexing of the spring 24 for release of the detent tooth 23 for adjustment or folding or collapsing of the seat back.

A foot rest, generally indicated at 26, is adjustably and swingably and foldably connected with the arm members 16 and 17, as at 27, and this foot rest supporting structure is preferably bowed out, as at 28, to fit over the forward edge of the seat cushion 2 and to depend adjacent to the forward side of the cushion. A step portion 29 forms a part of the foot rest 26, and this step portion 29 is swingably and foldably mounted or associated so that it can be swung to an extended position for use, as shown in Figure 1 and by the full lines in Fig. 2, and can be folded up or collapsed as shown by the dotted lines in Fig. 2. If desired, a fabric or other covering 30 can be incorporated or mounted as a part of the foot rest 26, and this covering 30 will protect the covering of the seat cushion 2 when the foot rest is in the lowered position, and will serve as a support for the legs and feet of the child, when the foot rest portion is swung up or elevated, as indicated by the dotted lines in Fig. 2.

Since the back portion 18 is fully and readily adjustable to support the child in upright sitting position or to provide for various angular inclination so that the child may partly or wholly recline, it is desirable that the foot rest portion 26 be also adjustable, and with this in mind I provide suitable adjusting means for raising the foot rest structure from the full line position of Figs. 1 and 2 to an elevated position, as shown by the dotted lines in Fig. 2, or to any desired angularly elevated position. With this in mind, adjusting bars 31 are slidably mounted in the side frame members of the base structure 1 and at their outer ends carry pivotally connected links 32 which are in turn pivotally connected with the foot rest structure 26, as at 33, at points spaced from the swinging mounting of this foot rest structure at 27. Slide bars 31 are provided with suitably spaced openings 34, and a spring urged latch pin 35 carried by the base structure 1 is mounted in position to be releasably engaged in the openings 34. A knob 36 is provided on pin 35 for manually withdrawing the pin from the openings 34, and the spring 37 normally resiliently urges the pin to hold within any desired opening 34. With the parts constructed in the manner set forth and described above in detail, it is possible to place and position and hold or anchor my improved automobile accessory seat upon the usual passenger seat structure of an automobile, bus, train, aeroplane, or the like, and a child placed within the seat will be seated at an elevation above the usual height of the passenger seat cushion 2 so that the child can see through and look from a window ordinarily provided adjacent to such passenger seat. At the same time, the accessory seat structure has the back and the floor rest portions thereof so associated that these parts can be independently adjusted to any desired angle of elevation. Further, since the step portion 29 is independently swingable, this step portion can be raised to lie flat and closely adjacent to the forward side of the passenger seat cushion 2 so that the accessory seat will not interfere with free and complete access to other seat portions. At the same time, the accessory seat can be expeditiously and conveniently detached, without the use of or necessity for special tools or implements, and can then be readily and compactly folded to permit packing or handling for transmission or while being carried.

Obviously, webbing or other suitable material can be employed in the construction of the parts 7, 8, 9 and 10, hereinbefore referred to as straps, and a single connection can be made forwardly and rearwardly from the accessory seat to the front and the back of the seat cushion 2, or two or more straps can be employed either or both in front and in back.

While I have herein shown and described only certain specific embodiments of my invention and have suggested only certain possible modifications, it will be appreciated that many variations can be made in the form and construction and mounting and association of the parts, without departing from the spirit and scope of my invention.

I claim:

1. An accessory seat for children adapted to be fitted and held upon a cushion of a passenger seat of an automobile and the like comprising a supporting structure carrying the accessory seat, straps extending forwardly and rearwardly from said supporting structure over the usual seat cushion and detachably connected at their free ends with the forward and rear edges of the seat cushion, side arms for said accessory seat, a back rest swingably and adjustably carried at the rear of said accessory seat, and a foot rest swingably and adjustably carried at the forward side of the accessory seat.

2. An accessory seat for children adapted to be fitted and held upon a cushion of a passenger seat of an automobile and the like comprising a supporting structure carrying the accessory seat, straps extending forwardly and rearwardly from said supporting structure over the usual seat cushion and detachably connected at their free ends with the forward and rear edges of the seat cushion, side arms for said accessory seat, a back rest swingably and adjustably carried at the rear of said accessory seat, a foot rest swingably and adjustably carried at the forward side of the accessory seat, means to retain the back rest in adjusted positions, and means to retain the foot rest in adjusted positions.

3. An accessory seat adapted for use when supported and held upon the cushion of an ordinary passenger seat comprising a supporting structure carrying the accessory seat and adapted to rest and be supported upon a seat cushion, straps extending from said supporting structure forwardly over the top and front sides of the seat cushion, straps extending rearwardly from said supporting structure over the top and the rear sides of the seat cushion, hooks at the ends of said forwardly and rearwardly extending straps detachably engaging with portions of the passenger seat cushion anchoring said straps and holding the accessory seat in position for use, said straps and hooks serving to hold the accessory seat structure upon the passenger seat cushion intermediate the front and the rear thereof, a back rest swingably adjustably mounted on the back part of the accessory seat structure, a foot rest adjustably swingably mounted on the forward part of the accessory seat structure, means to hold said back rest in adjusted positions, and means to hold said foot rest in adjusted positions.

CHARLEY HENRY SMITH.